US012663507B2

(12) United States Patent
Keränen et al.

(10) Patent No.: US 12,663,507 B2
(45) Date of Patent: Jun. 23, 2026

(54) ANTENNA FOR A RADAR APPARATUS

(71) Applicant: Vaisala Oyj, Helsinki (FI)

(72) Inventors: Reino Keränen, Espoo (FI); Markus Berg, Kiiminki (FI); Tommi Tuovinen, Tyrnävä (FI); Janne Junttila, Helsinki (FI); Antti Kivijärvi, Helsinki (FI); Jukka Sirola, Tampere (FI); Petri Hautaniemi, Jokela (FI)

(73) Assignee: Vaisala Oyj, Helsinki (FI)

( * ) Notice: Subject to any disclaimer, the term of this patent is extended or adjusted under 35 U.S.C. 154(b) by 486 days.

(21) Appl. No.: 18/180,000

(22) Filed: Mar. 7, 2023

(65) Prior Publication Data

US 2023/0288532 A1　　Sep. 14, 2023

(30) Foreign Application Priority Data

Mar. 9, 2022　(EP) ..................................... 22161037

(51) Int. Cl.
*G01S 7/35* (2006.01)
*H01Q 9/04* (2006.01)
*H01Q 19/06* (2006.01)

(52) U.S. Cl.
CPC .............. *G01S 7/352* (2013.01); *H01Q 9/045* (2013.01); *H01Q 19/062* (2013.01)

(58) Field of Classification Search
CPC .... H01Q 19/062; H01Q 9/045; H01Q 21/065; G01S 7/352
See application file for complete search history.

(56) References Cited

U.S. PATENT DOCUMENTS

| | | | |
|---|---|---|---|
| 6,590,544 B1 | 7/2003 | Filipovic | |
| 6,600,441 B2 * | 7/2003 | Liedtke ..................... | B25F 5/00 |
| | | | 342/195 |
| 2008/0091380 A1 * | 4/2008 | Nagasaku .............. | H01Q 15/08 |
| | | | 702/142 |

(Continued)

FOREIGN PATENT DOCUMENTS

| | | | | |
|---|---|---|---|---|
| EP | 3490062 A1 * | 5/2019 | ........... | G01S 13/931 |

OTHER PUBLICATIONS

European Office Action, as issued in connection with European Application No. 22 161 037.1, dated Feb. 7, 2023, 7 pgs.

*Primary Examiner* — Resha Desai
*Assistant Examiner* — Peter Davon Doze
(74) *Attorney, Agent, or Firm* — MASCHOFF BRENNAN; Paul G. Johnson

(57) ABSTRACT

An antenna assembly includes first and second feed antennas and a lens element. The first feed antenna is arranged to transmit outbound radio waves of a transmitter beam. The second feed antenna is arranged to capture a received RF signal. The lens element is arranged to collimate the transmitter beam and to focus the receiver beam. The first and second feed antennas are disposed on a conductive ground plane that is offset from a back end of the lens element by a predefined distance in direction of a center axis of the lens element. A volume between the back end of the lens element and the ground plane comprises material that has a refractive index that is smaller than that of the lens element for converging the outbound and inbound RF beams between the back end of the lens element and the first and second feed antennas.

13 Claims, 3 Drawing Sheets

(56)                References Cited

U.S. PATENT DOCUMENTS

| | | | |
|---|---|---|---|
| 2009/0033539 A1* | 2/2009 | Zemany ............... | H01Q 21/065 |
| | | | 342/22 |
| 2009/0273508 A1* | 11/2009 | Binzer .................. | G01S 13/931 |
| | | | 342/175 |
| 2010/0328779 A1 | 12/2010 | Llombart et al. | |
| 2012/0146882 A1* | 6/2012 | Binzer ................. | H01Q 1/3233 |
| | | | 343/911 R |
| 2019/0165461 A1* | 5/2019 | Shiozaki ................ | H01Q 21/08 |

* cited by examiner

ANTENNA FOR A RADAR APPARATUS

TECHNICAL FIELD

The example and non-limiting embodiments of the present invention relate to an antenna assembly for a radar apparatus and/or to a radar apparatus employing the antenna assembly.

BACKGROUND

In general, a radar is a detection system that applies radio frequency (RF) waves for detecting targets at distant locations via using a transmitter to transmit radio waves, a receiver to receive reflections of the transmitted radio waves from remote targets, and a processing system for determining characteristics of the remote targets (such as their locations and velocities) based on the received radio waves. The radio waves reflected from the remote targets may be also referred to as backscattered radio waves or as backscattered RF signal. Radars find use in a wide range of different applications, including monitoring location and movement of distinct objects such as road vehicles, aircrafts, marine vessels as well as observing evolution of atmospheric and meteorological parameters.

Typically, a radar intended e.g. for atmospheric and/or meteorological applications aims at observing a plurality of relatively small targets at relatively long distances from the radar and, subsequently, estimating their characteristics in an accurate and reliable manner. Herein, the characteristics of targets under consideration may include their respective shapes and sizes, their respective distances from the radar, and their respective movement with respect to the radar. Moreover, the radar may aim at estimating such target characteristics for large quantities of targets distributed in the atmosphere at distances that may extend from a few meters e.g. up to a few hundred kilometers.

As an example of such a radar design, FIG. 1A illustrates a block diagram of some components of a radar apparatus while also schematically illustrating some aspects of operation of the radar apparatus. The radar apparatus of FIG. 1A includes an antenna assembly 10 comprising a feed antenna 11 and a lens element 12. FIG. 1B schematically illustrates a cross-sectional view to the antenna assembly 10 according to an example, showing the lens element 12 having a convex (e.g. substantially ellipsoidal) front end and a planar back end, where the feed antenna is arranged on the back end of the lens element 12 at a phase center 14 of the lens element 12. The feed antenna 11 is coupled via a coupler 25 to a transmitter 20, which supplies a RF signal for transmission as the radio waves from the feed antenna 11. The feed antenna 11 is further coupled via the coupler 25 to a receiver 30, which receives a RF signal captured at the feed antenna 11. The coupler 25 enables highly efficient respective signal paths between the transmitter 20 and the feed antenna 11 and between the feed antenna 11 and the receiver 30 while serving to prevent power of the transmitted RF signal from entering the receiver 30, thereby providing isolation between the transmitted and received RF signals. The transmitter 20 and the receiver 30 are coupled to a processing unit 50 arranged for controlling respective operation of the transmitter 20 and the receiver 30 and for processing the transmitted and received RF signals.

The lens element 12 serves as a converging lens arranged to collimate radio waves transmitted (TX) from the feed antenna 11 into a sequence of waves 13a of a RF beam 13 transmitted from the antenna assembly 10 and to focus radio waves received (RX) at the antenna assembly 10 to the feed antenna 11. When meeting a target 40 at a distance from the antenna assembly 10, the sequence of waves 13a that represent the RF signal supplied from the transmitter 20 to the feed antenna 11 results in a corresponding series of backscattered (or reflected, echoed) waves 43a that may be received at the antenna assembly 10 and captured at the feed antenna 11 in the received RF signal that is supplied to the receiver 30, whereas the processing unit 50 may derive various characteristics of detected targets based on the transmitted and received RF signals.

A portion of the front end of the lens element 12 that is available for transmission and reception of radio waves may be referred to as a (mechanical) antenna aperture, whereas a portion of the (mechanical) antenna aperture that is actually applied for transmission and reception of the radio waves may be referred to as an effective antenna aperture. The size of the (mechanical) antenna aperture and the effective antenna aperture may be defined, for example, via the diameter of its projection (e.g. its cross-section). Hence, in the example illustrated in FIGS. 1A and 1B the sequence of waves 13a of the transmitted RF beam 13 exit the antenna assembly 10 via an antenna aperture at the front end of the lens element 12 and the backscattered waves 43 from the target 40 are received at the antenna assembly 10 via the antenna aperture.

Given the maximal mechanical antenna aperture permitted by the application, the antenna design can be optimized towards a conceptual limit of large directivity (given the maximum antenna aperture size allowed and the carrier RF wavelength in use in the application);

small losses (leakage and dissipation of signals); and stable beam patterns (a well-shaped main beam lobe with minimal side lobes).

In a preferred design of an antenna assembly 10 the lens element 12 has a well-defined phase center 14 at which the feed antenna 11 can be positioned, where physical dimensions of the lens element 12 follow from the electrical properties of the material of the lens element 12. Among the lens materials that are technically well suited for millimeter RF applications and viable in practical applications, the choice of material follows from considerations regarding sufficiently low losses (e.g. high transparency and low reflections at boundaries), regarding high permittivity (focusing power) and regarding any application specific constraints concerning lens element 12 characteristics such as weight, cost and robustness to different usage environments. There is a tendency to favor materials of relatively low permittivity, which leads to relatively lengthy geometric shapes of the lens element 12. The shape of the lens element 12 is prolongated by a large eccentricity (e.g. a large degree of ellipticity) and by a longish cylindrical extension part of the lens element 12.

In the typical outcome of the prior-art design path, due to a commonly applied design principle of positioning the feed antenna 11 at the phase center 14 defined by geometry of the lens element 12, the prolongated shape of the lens element 12 typically results in certain detrimental trade-offs:

1) The total height and weight of the antenna element 12 tend to become unacceptably high for applications that are constrained in space and in maximal weight.

2) Considering a relatively wide beam pattern radiated by a preferred simple and compact feed antenna 11, a substantial part of the transmitted RF beam 13 is spread outside the area covered by the effective antenna aperture, leading to leakage of transmitted power on the sides of the antenna element 12 (e.g. components 13b of the transmitted RF beam 13 in the illustration of FIG. 1B) as well as to occurrences of multiple reflections within the lens element 12. These features degrade the performance of the antenna assembly 10 in terms of directivity and of losses (e.g. net antenna gain). The leakages may pose a problem in view of regulatory approvals required for general use in presence of other RF applications. Reciprocally, the RX signal paths outside the nominal antenna aperture tend to permit interfering signals entering in the receiver 30. Known solutions for mitigation such detrimental characteristics of the antenna assembly 10 include e.g. the following:
application of a more complicated design of the feed antenna 11,
application of a more complicated geometry for the lens element 12, and/or
introduction of additional absorbers around the antenna assembly 10.
However, such solutions run a risk of complicating mechanical feasibility, increasing the size, weight and/or manufacturing costs of the antenna assembly 10, thereby possibly ending up with an approach where the eventual outcome is further away from the prime design objectives (size, weight and cost).

In all radar applications, a sufficiently high signal power with respect to omnipresent background noise is required for reliable detection and accurate measurements. This requirement of a relatively high signal-to-noise power ratio (SNR) becomes imperative when observing targets such as small atmospheric constituents for which the backscattered signals are diminished radically as function of their size. Characteristics of the antenna assembly 10 such as high directivity (narrow and regular pattern) and low losses are key contributors towards optimized SNR of echoes from the target 40. As evident in the radar signal power equations that are well-known in the art, directivity of the antenna assembly 10 and an inverse of losses occurring in the antenna assembly 10 contribute quadratically to the SNR of the echoes from the target 40. Consequently, optimized performance of the antenna assembly 10 is typically the most convenient and most cost-efficient means to reach high radar system performance in comparison to alternative means such as an increased transmitter power, which comes with a number of disadvantages and complications.

As discussed above, the coupler 25 may be applied to ensure sufficient isolation between the transmitted and received RF signals. The requirement of isolation is present in radar systems utilizing pulsed operation of transmission as well as in frequency modulated continuous wave (FMCW) radars. As known in the art, the time multiplexing scheme of pulsed radar allows signals to be received while transmission is paused. However, in order ensure sufficient isolation, dedicated components such as an isolator and/or a limiter are needed to protect the receiver from high intensity RF power during the transmitted pulse. Moreover, in pulsed operation a target 40 cannot be observed in a dead zone, in terms of distance from the antenna assembly 10 corresponding to a combined traveling distance of the radio waves emitted from the antenna assembly 10 to the target 40 and traveling distance of the waves scattered back to the antenna assembly 10 from the target during the transmission and the subsequent receiver recovery period.

The issue with the dead zone may be addressed at least to some extent via application of a frequency modulated continuous wave (FMCW) radar. In such a radar design the transmission and reception take place simultaneously, thereby basically enabling detection of the target 40 also when it is in close proximity of the antenna assembly 10. On the other hand, in such a radar design the issue with sufficient isolation between the transmitted and received RF signals needs to be addressed to ensure sufficient detection performance. in addition to the usage of the coupler 25 illustrated in FIG. 1A, other known solutions in this regard include e.g. the following:
i) application of distinct antenna systems for transmission and reception;
ii) operation of transmission and reception in orthogonal states of polarization;
iii) application of a (highly) directional coupler as the coupler 25 to provide the respective signal paths from the transmitter 20 to the feed antenna 11 and from the feed antenna 11 to the receiver 30.

While addressing the sufficient isolation between the transmitted and received RF signals, each of these solutions comes with certain drawbacks: i) at least partially re-introduces the dead zone present with pulsed radars because the transmitted and received beams do not overlap within a non-negligible distance in front of the distinct antenna systems while an arrangement of two distinct antenna systems leads to mechanically bulky and complicated structures, ii) results in compromised performance in case of irregularly shaped targets that provide high cross-polarization in backscattered signals, and iii) introduces a relatively high additional losses in the signal paths between the transmitter 20 and the feed antenna 11 and between the feed antenna 11 and the receiver 30 while also resulting in additional challenges at millimeter RF wavelengths in establishing stable matched impedances and in optimizing the size of the antenna assembly 10.

SUMMARY

It is an object of the present invention to provide an antenna assembly for a radar apparatus to facilitate detecting and distinguishing a plurality of targets of various sizes at various distances from the antenna assembly to enable deriving one or more characteristics of the detected targets at a high resolution and accuracy, whereas it is a further object of the present invention to provide a radar apparatus making use of such an antenna assembly to derive the one or more characteristics of a plurality of targets of various sizes at various distances from the antenna assembly at a high resolution and accuracy.

According to an example embodiment, an antenna assembly for a radar apparatus is provided, the antenna assembly comprising: a first feed antenna arranged to transmit outbound radio waves of a transmitter beam based on a transmitted RF signal supplied thereto and a second feed antenna arranged to capture a received RF signal based on inbound radio waves of a receiver beam received thereat; and a lens element arranged to collimate the transmitter beam obtained via a back end of the lens element for transmission from a front end of the lens element to a monitoring direction and to focus the receiver beam received at the front end of the lens element from the monitoring direction for reception via the back end of the lens element at the second feed antenna, wherein the first and second feed antennas are disposed on a conductive ground plane that is offset from the back end of the lens element by a predefined distance in direction of a center axis of the lens element, and wherein a volume between the back end of the lens element and the ground plane comprises material that has a refractive index that is smaller than that of the lens element for converging the outbound and inbound RF beams between the back end of the lens element and the first and second feed antennas.

According to another example embodiment, a radar apparatus is provided, the radar apparatus comprising an antenna assembly according to the example embodiment described in the foregoing and a transmitter arranged to supply the transmitted RF signal to the first feed antenna and a receiver arranged to receive the received RF signal captured at the second feed antenna; and a processing unit arranged to determine, based on the received RF signal in consideration of the transmitted RF signal, respective characteristics of one or more targets at distance from the antenna assembly in the monitoring direction, wherein said characteristics include at least one of the following: respective locations of the one or more targets, respective velocities of the one or more targets, respective sizes of the one or more targets, respective shapes of the one or more targets.

The exemplifying embodiments of the invention presented in this patent application are not to be interpreted to pose limitations to the applicability of the appended claims. The verb "to comprise" and its derivatives are used in this patent application as an open limitation that does not exclude the existence of also unrecited features. The features described hereinafter are mutually freely combinable unless explicitly stated otherwise.

Some features of the invention are set forth in the appended claims. Aspects of the invention, however, both as to its construction and its method of operation, together with additional objects and advantages thereof, will be best understood from the following description of some example embodiments when read in connection with the accompanying drawings.

BRIEF DESCRIPTION OF FIGURES

The embodiments of the invention are illustrated by way of example, and not by way of limitation, in the figures of the accompanying drawings, where.

DESCRIPTION OF SOME EMBODIMENTS

Figure 2:
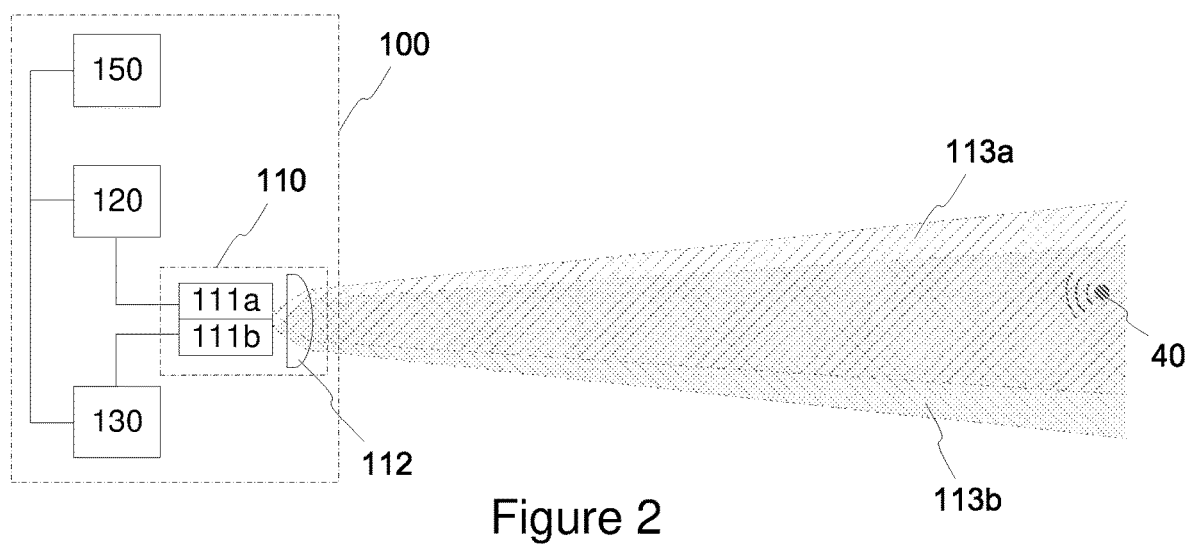
FIG. 2 illustrates a block diagram of some components of a radar apparatus together with a block diagram of some components of the radar apparatus according to an example.

FIG. 2 illustrates a radar apparatus 100 according to an example, including a schematic illustration of some components of an antenna assembly 110 together with a block diagram of some (other) components of the radar apparatus 100. The radar apparatus 100 is shown in the example of FIG. 2 with the antenna assembly 110, a transmitter 120, a receiver 130, and a processing unit 150. The radar apparatus 100 may be employed for applications where simultaneous detection and tracking of a plurality of targets is required, such as for meteorological and/or atmospheric studies. In this regard, FIG. 2 provides a simplified illustration of the radar apparatus 100, showing only components that are necessary for describing operation and various advantageous characteristics of the radar apparatus 100 and/or antenna assembly 110 according to the present disclosure, whereas a radar apparatus 100 and/or the antenna assembly 110 may include one or more components not included in the illustration of FIG. 2 without departing from the scope of the present disclosure.

The antenna assembly 110 comprises a feed antenna arrangement and a lens element 112, where the feed antenna arrangement may comprise a first feed antenna 111a and second feed antenna 111b. In an example, the first feed antenna 111a may be arranged for transmission and the second feed antenna 111b may be arranged for reception, whereas the lens element 112 may comprise a converging lens that is arranged to collimate a transmitter beam 113a received via its back end for transmission from (an antenna aperture in) its front end and to focus a receiver beam 113b received at (the antenna aperture in) its front end for reception via its back end. The back end of the lens element 112 may be also referred to as a back surface of the lens element 112 or as a bottom of the lens element 112, whereas the front end of the lens element 112 may be also referred to as a front surface of the lens element 112 or as a top of the lens element 112.

Figure 1A:
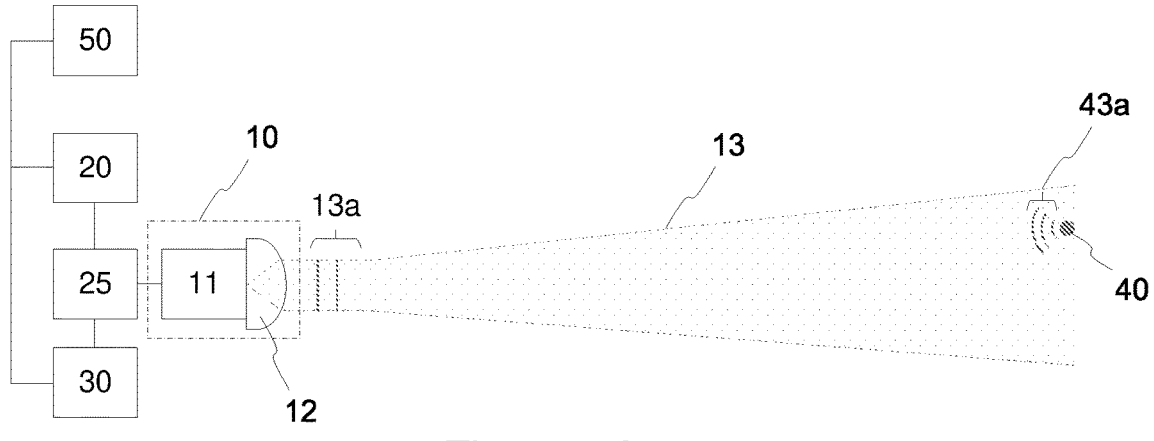
FIGS. 1A and 1B illustrate a block diagram of some components of a radar apparatus together with schematically illustrating some aspects of operation of the radar apparatus known in the art.

The first feed antenna 111a may be arranged to transmit outbound radio waves of the transmitter beam 113a based on a (to be) transmitted RF signal supplied thereto from the transmitter 120, whereas the first feed antenna 111a may be positioned with respect to the lens element 112 such that the transmitter beam 113a is directed towards the lens element 112 via its back end, thereby resulting in transmission of the collimated transmitter beam 113a from the front end of the lens element 112. The second feed antenna 111b may be arranged capture a received RF signal based on inbound radio waves of the receiver beam 113b received thereat and supply the received RF signal to the receiver 130. The second feed antenna 111b may be positioned with respect to the lens element 112 such that it is able to receive the receiver beam 113b via the back end of the lens element 112. In the course of its operation, the radar apparatus 100 is positioned such that the outbound radio waves of the transmitter beam 113a emitted from the front end of the lens element 112 are directed to a monitoring direction of interest, whereas radio waves echoed (or reflected, backscattered) from one or more targets in the monitoring direction are received as the inbound radio waves of the receiver beam 113b and captured in the received RF signal that is descriptive of respective characteristics of the one or more targets. The first feed antenna 111a may be coupled to the transmitter 120 via a first signal path and the second feed antenna 111b may be coupled to the receiver 130 via a second signal path that is separate and isolated from the first signal path. The transmitter 120 may provide the outbound RF signal to the first feed antenna 111a, whereas the receiver 130 may obtain the inbound RF signal from the second feed antenna 111b. Usage of the separate feed antennas 111a, 111b for transmission and reception in such arrangement with respect to the transmitter 120 and the receiver 130 eliminates the need for the (directional) coupler 25 applied in previously known solutions (cf. FIG. 1A) while enabling sufficient isolation between the transmitted and received RF signals, thereby substantially providing the functionality of the coupler 25 via an approach that results in smaller losses and that is more straightforward and affordable in design in comparison to the (directional) coupler 25.

An entity comprising the antenna assembly 110, the transmitter 120 and the receiver 130 may be referred to as a transceiver, even though depicted in the example of FIG. 2 as respective separate (logical) entities. The transmitter 120 and the receiver 130 may be coupled to the processing unit 150, which may be arranged to control respective operation of the transmitter 120 and the receiver 130. The processing unit 150 may be further arranged to implement one or more RF processing steps such as conversions between a baseband and the applied carrier frequency and to derive one or more characteristics of the one or more targets based on the received RF signal in view of the transmitted RF signal. In this regard, the processing unit 150 may apply signal processing techniques known in the art and commonly applied for processing of radar signals to derive e.g. respective one or more characteristics of the one or more targets based on the received RF signal, e.g. based on spectral characteristics of the received RF signal, in consideration of the transmitted RF signal. Herein, the one or more characteristics derived for each of the one or more targets may include one or more of the following:

position of the respective target,
  size of the respective target,
  shape of the respective target, and
  motion (e.g. velocity) of the respective target.

Hence, in an example, the radar apparatus 100 may enable simultaneously detecting and distinguishing a plurality of targets at remote locations and deriving their respective positions, velocities and one or more other characteristics (such as their shapes and/or sizes) across a wide range of distances from the radar apparatus 100 at a high accuracy and reliability.

Various aspects of structure and operation of the antenna assembly 110 that enables such radar performance are described in the non-limiting examples provided in the following.

In an example, the radar apparatus 100 may rely on frequency modulated continuous wave (FMCW) transmission and reception. As an example in this regard, the transmitter 120 and the receiver 130 may be implemented as respective elements of a Doppler transceiver that is arranged to apply frequency modulated continuous wave (FMCW) transmission and reception, which may be referred to as a FMCW Doppler transceiver. While the antenna assembly 110 according to the present disclosure is applicable across the RF wavelengths, in a non-limiting example a carrier wavelength in a range from a fraction of one millimeter to a few tens of millimeters, e.g. 5 millimeters, may be applied. Such carrier wavelengths enable usage of RF bandwidths in a range of several hundred MHz or even in a range of a few GHz (depending on the applied carrier wavelength), which in turn enables a relatively high spatial resolution that may be advantageous, for example, in meteorological or atmospheric applications e.g. for detection of precipitation particles, cloud particles and/or other constituents of ambient air as well as for detection of other objects in radar environment.

Figure 3A:
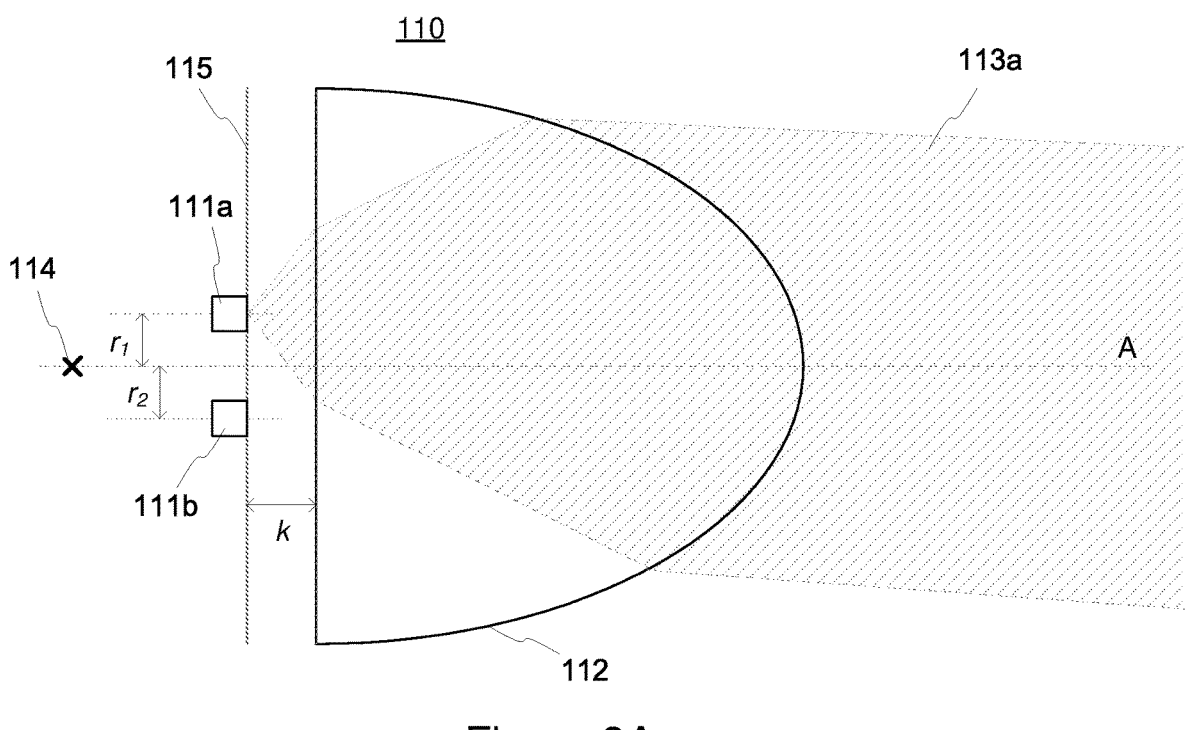
FIG. 3A schematically illustrates some aspects of an antenna assembly according to example.
Figure 3B:
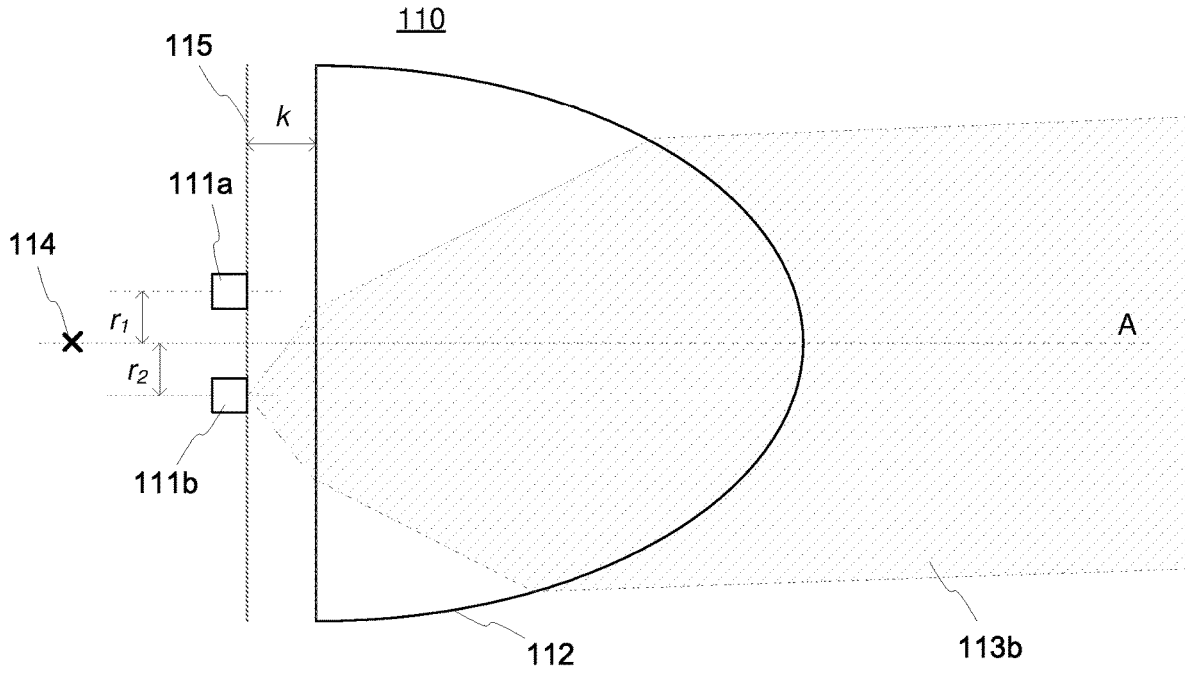
FIG. 3B schematically illustrates some aspects of an antenna assembly according to example.

FIGS. 3A and 3B schematically illustrate a cross-sectional view to the antenna assembly 110 according to an example, showing the first feed antenna 111a, the second feed antenna 111b and the lens element 112. The lens element 112 may comprise a suitably shaped piece of dielectric material that is transparent or substantially transparent to the respective radio waves of the transmitter beam 113a and the receiver beam 113b at wavelengths applied by the transmitter 120 and the receiver 130. In this regard, the respective illustrations of FIGS. 3A and 3B are conceptual ones in the sense they serve to illustrate approximate arrangement of the first and second feed antennas 111a, 111b with respect to the lens element 112 and approximate respective shapes of the transmitter beam 113a and the receiver beam 113b resulting from such an arrangement. On the other hand, the respective illustrations of FIGS. 3A and 3B do not serve to illustrate any physically exact features of the antenna assembly 110 in terms of shapes and size of its components or in terms of their exact positions with respect to each other.

As a non-limiting example, the lens element 112 may be made of polyethene (PE), such as high-density polyethylene (HDPE). In another example, the lens element 112 may be made of cross-linked polystyrene, whereas in further examples the lens element 112 may be made of a material such as nylon, boron nitride or quartz. Along the lines described in the foregoing, the lens element 112 may serve as a converging lens. In an example in this regard, the lens element 112 may have a substantially circular cross-section, whereas the front end of the lens element 112 may be convex and the back end of the lens element 112 may be substantially planar. In an example, the convex front end of the lens element 112 may have or it may approximate an ellipsoidal shape, the front end of the lens element 112 thereby following or approximating a surface of a truncated prolate spheroid or a truncated oblate spheroid. The front end of the lens element 112 or a portion thereof may serve as the antenna aperture of the antenna assembly 110.

The first feed antenna 111a may be disposed at a first distance $r_1$ from a center axis A of the lens element 112, whereas the second feed antenna 111b may be disposed at a second distance $r_2$ from the center axis A where each of the first distance $r_1$ and the second distance $r_2$ may be set to a respective non-zero value, thereby laterally offsetting the first and second feed antennas 111a, 111b from the center axis A. In this regard, the first feed antenna 111a may be offset from the center axis A into a first direction and the second feed antenna 111b may be offset from the center axis A into a second direction, where the first and second directions are respective directions different from each other. In an example, the first distance $r_1$ may be substantially equal to the second distance $r_2$ (i.e. $r_1 = r_2 = r$), thereby disposing the first and second feed antennas 111a, 111b at opposite sides of the center axis A at substantially the same distance from the center axis A. In another example, alternatively or additionally, the first and second directions may be opposite to each other, thereby placing the first and second feed antennas 111a, 111b at opposite sides of the center axis A at a distance $r_1 + r_2$ from each other. In a further example, one of the first distance $r_1$ and the second distance $r_2$ may be zero (while the other one is non-zero), thereby placing one of the first and second feed antennas 111a, 111b at the center axis A.

Hence, depending on the respective choices of the first distance $r_1$ and the second distance $r_2$, at least one of the first and second feed antennas 111a, 111b is laterally offset from the center axis A of the lens element 112. Consequently, the center axis of transmitter beam 113a exhibits a minor 'tilt' in comparison to the center axis A of the lens element 112 towards a direction that is the opposite of the first direction by an amount that at least partially depends on the first distance $r_1$ between the first feed antenna 111a and the center axis A. Along similar lines, the center axis of the receiver beam 113b becomes 'tilted' in comparison to the center axis A of the lens element 112 towards a direction that is opposite to the second direction by an amount that at least partially depends on the second distance $r_2$ between the second feed antenna 111b and the center axis.

The schematic illustrations of FIGS. 3A and 3B depict the lens element 112 as a plano-convex lens, whereas in various examples the lens element 112 may comprise a converging lens element of any type, e.g. a plano-convex lens, a positive meniscus lens or a biconvex lens. In an example, the lens element 112 may comprise an axially symmetric lens, where the center axis of the lens element 112 also serves as its symmetry axis, whereas in another example the lens element 112a may comprise an axially asymmetric lens. Moreover, the schematic illustrations of FIGS. 3A and 3B illustrate the lens element 112 as one following or approximating a shape of a truncated spheroid, whereas in other examples the lens element 112 may comprise a front portion following or approximating a shape of the truncated spheroid and a back portion that has a substantially cylindrical shape having a cross-section that is substantially the same as the cross-section of front portion, where the front and back portions may be provided as a single-piece element.

Each of the first feed antenna 111a and the second feed antenna 111b may be disposed on a conductive ground plane 115 that is at a predefined distance k behind the back end of the lens element 112 along the center axis A. In other words, the first and second feed antennas 111a, 111b may be disposed on the ground plane 115 that is perpendicular to the center axis A of the lens element 112 and that is offset by a distance k from the back end of the lens element 112 in the direction of the center axis A. In this regard, the expression 'behind the back end of the lens element 112' refers to a spatial position that is further away from the antenna aperture at the front end of the lens element 112 than the back end of the lens element 112 such that the first and second feed antennas 111a, 111b are offset from the back end of the lens element 112 by the predefined distance k in the direction of the center axis A.

Moreover, a volume between the back end of the lens element 112 and the ground plane 115 at the first and second feed antennas 111a, 111b are disposed comprises or is made of material that has a refractive index that is smaller than that of the lens element 112. Hence, this volume between the back end of the lens element 112 and the first and second feed antennas 111a, 111b constitutes an electromagnetic band gap (EBG), which serves to converge the transmitter beam 113a upon entry from the EBG to the lens element 112 and to focus the receiver beam 113b upon entry from the lens element 112 to the EBG:

The transmitter beam 113a emitted from the first feed antenna 111a comprises a divergent RF beam, whereas the EBG serves to reduce the divergence of the transmitter beam 113a upon entry from the EBG to the lens element 112 via its back end;

The receiver beam 113b within the lens element 112 comprises a convergent RF beam, whereas the EBG serves to increase the convergence of the receiver beam 113b upon entry from the lens element 112 (via its back end) to the EBG.

The distance k between the back end of lens element 112 and the plane 115 at which the first and second feed antennas 111a, 111b are disposed may be also referred to as a depth of the EBG (or as an EBG depth). In an example, the EBG may comprise an airgap or a vacuum arranged between the first and second feed antennas 111a, 111b and the back end of the lens element 112, whereas in other examples the EBG may comprise solid material having refractive index smaller than that of the material applied in the lens element 112.

The EBG depth k may be chosen in accordance with the applied carrier wavelength λ, for example by setting $$k = 0.5 \frac{\lambda}{\sqrt{\varepsilon_{rc}}}$$

where $\varepsilon_{rc}$ denotes relative dielectric constant of the material applied for providing EBG. As an example in this regard, in case the EBG comprises an airgap or a vacuum arranged between the plane 115 and the back end of the lens element 112, the distance k that defines the EBG depth may be substantially half of the wavelength of the applied carrier wavelength λ.

Figure 1B:
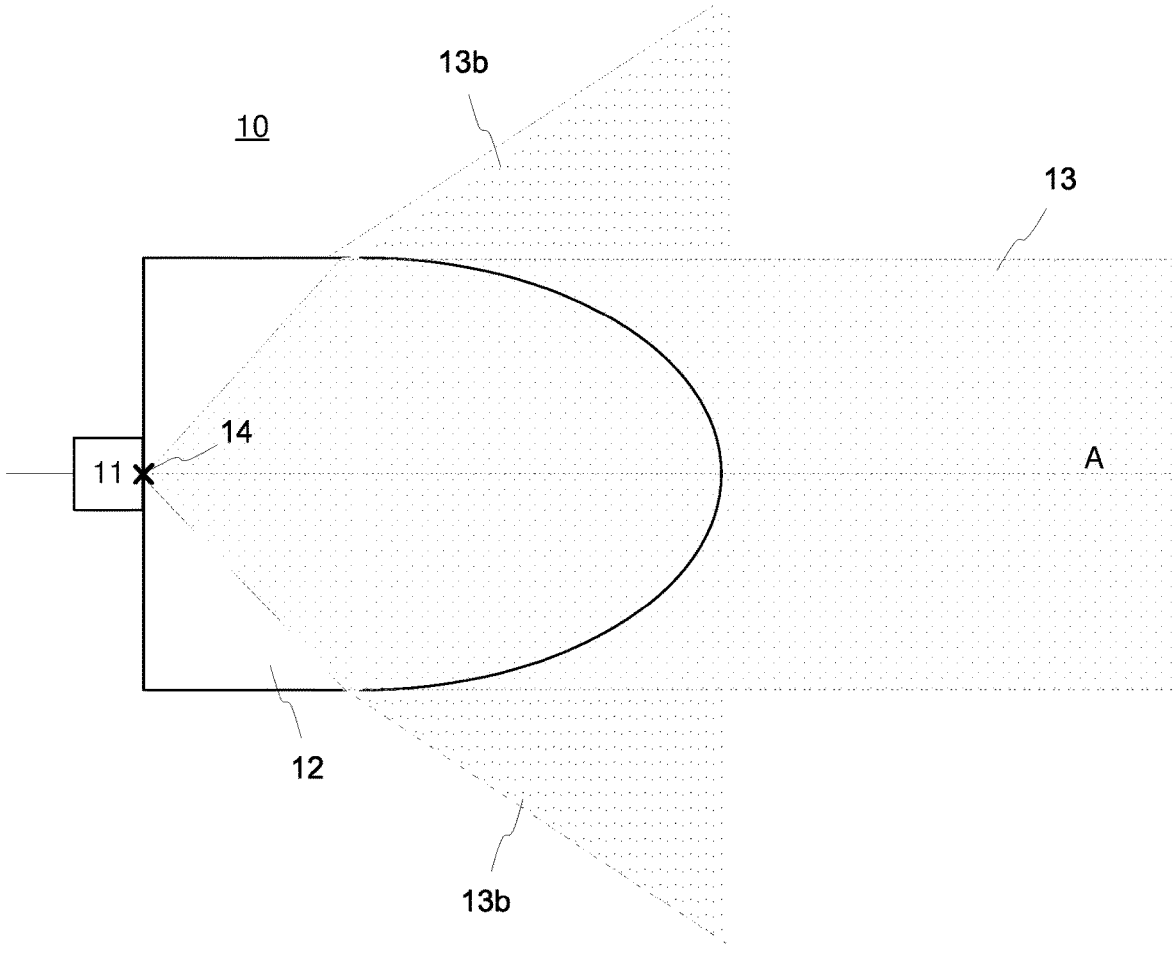

Due to the EBG serving to converge the transmitter beam 113a and the receiver beam 113b passing therethrough, application of the EBG between the ground plane 115 and the back end of the lens element 112 serves to shift the phase center of the antenna assembly 110 substantially closer to the front end of the lens element 112, where the shift is substantially larger than the EBG depth k. This enables reduced size of the antenna assembly 110 in terms of its length in the direction of the center axis A of the lens element 112 without compromising the RF performance. To illustrate the aspect of reduced size of the antenna assembly 110, FIGS. 3A and 3B illustrate the position of a virtual phase center 114, which denotes the conceptual position of the phase center of the lens element 112 if excluding the convergence introduced by the EBG and which would be the position of the antenna 11 and hence position of the back end of the lens element 12 in a previously known solution described in the foregoing with references to FIGS. 1A and 1B. The virtual phase center 114 may be also referred to as an effective phase center.

In addition to enabling reduced size of the antenna assembly 110, the aspect of shifting the phase center closer to the front end of the lens element 112 further facilitates reducing power leakage from the sides of the lens element 112. In examples where the EBG is provided as an airgap or vacuum between the ground plane 115 and the back end of the lens element 112 or where the EBG otherwise comprises or is made of material that has a density substantially smaller than that of the lens element 112, a further advantage arising from application of the EBG is reduced weight of the antenna assembly 110. In addition to advantages related to the physical size and weight of the antenna assembly 110, the EBG functionality introduces a substantial geometric space between the back end of the lens element 112 and the virtual phase center 114. The distinct first and second feed antennas 111a, 111b disposed on the ground plane 115 may be positioned in this space, noting that the EBG depth k is relatively small in comparison to the distance between the back end of the lens element 112 and the virtual phase center 114. In such an arrangement, the transmitter beam 113a and the receiver beam 113b closely match respective (ideal) beams originating from the virtual phase center 114, whereas at the antenna aperture on the front end of the lens element 112 the transmitter beam 113a and the receiver beam 113b appear as if originating from the virtual phase center 114, thereby mitigating any adverse effect that may arise from offsetting at least one of the first and second feed antennas 111a, 111b from the center axis A of the lens element 112 by the respective distances $r_1$ and $r_2$.

The first feed antenna 111a may be arranged for transmission of the outbound radio waves of the transmitter beam 113a using polarization having an orientation that is aligned in accordance with a (conceptual) line connecting respective positions of the first feed antenna 111a and the second feed antenna 111b, where the orientation of polarization may be defined as the direction of E component of the electromagnetic field vectors of the transmitter beam 113a. In this regard, the (conceptual) line that connects the respective positions of the first and second feed antennas 111a, 111b may be parallel to the projection plane of FIGS. 3A and 3B.

In an example, the orientation of polarization may be substantially aligned with the (conceptual) line connecting the first and second feed antennas 111a, 111b, whereas in another example the orientation polarization may be substantially perpendicular to the (conceptual) line connecting the first and second feed antennas 111a, 111b. Accordingly, for optimized antenna performance, the orientation of polarization of the second feed antenna 111b applied for reception is substantially aligned with the polarization of the first feed antenna 111a applied for transmission. This choice leads to a preferred illumination pattern at the antenna aperture, which further mitigates any tilting of the beam axes that may occur due to offsetting at least one of the first and second feed antennas 111a, 111b from the center axis A of the lens element 112 by the respective distances $r_1$ and $r_2$.

In an example, the antenna assembly 110 may comprise a circuit board, such as a printed circuit board (PCB) that has a first patch antenna and a second patch antenna arranged thereon, where the first patch antenna may serve as the first feed antenna 111a and the second patch antenna may serve as the second feed antenna 111b. In this regard, the circuit board may include a conductive layer (e.g. one made of metal such as copper) serving as the ground plane 115 or the circuit board may have a conductive plate serving as the ground plane 115 arranged thereon, whereas the first and second patch antennas may be disposed on the conductive layer or on the conductive plate (whichever applies). The conductive layer or conductive plate may comprise or it may be made of metal such as e.g. copper. Herein, the spatial arrangement of the first and second patch antennas with respect to each other may follow the spatial arrangement of the first and second feed antennas 111a, 111b with respect to the center axis A of the lens element 112. Moreover, the first patch antenna may be provided with a first conductive coupling that enables connecting the first patch antenna to the transmitter 120 and the second patch antenna may be provided with a second conductive coupling that is separate and isolated from the first conductive coupling and that enables connecting the second patch antenna to the receiver 130. In an example, the transmitter 120 and/or the receiver 130 may be also arranged on the circuit board, whereas in other example the transmitter 120 and/or the receiver may be provided outside the circuit board hosting the first and second patch antennas and they may be connected to the respective one of the first and second patch antennas via the respective conductive couplings.

The circuit board hosting the first and second patch antennas may be mounted on the back side of the lens element 112 or, conversely, the back side of the lens element 112 may be mounted on the circuit board. In this regard, the circuit board may be mounted on the back side of the lens element 112 such that the first patch antenna is disposed at the first distance $r_1$ from the center axis A of the lens element 112 in the first direction from the center axis A, that the second patch antenna is disposed at the second distance $r_2$ from the center axis A of the lens element 112 in the second direction from the center axis A, and that the first and second patch antennas are disposed on a plane that is at the distance k from the back end of the lens element 112 in the direction of the center axis A of the lens element 112, the conductive plate arranged on the surface of the circuit board thereby serving as the ground plane 115. In other words, the circuit board may be mounted on the back side of the lens element 112 (or vice versa) such that the first and second patch antennas serving respectively as the first and second feed antennas 111a, 111b assume their respective positions with respect to the lens element 112 in accordance with the examples described in the foregoing. The circuit board may have a substantially planar shape to facilitate mounting to the lens element 112. According to an example, the lens element 112 may be provided with one or more mounting elements (e.g. mounting taps) that can be fixed to respective one or more counter-elements (e.g. mounting recesses or mounting holes) provided in the circuit board, wherein a mounting mechanism provided by the one or more mounting elements and the one or more counter-elements is arranged to ensure correct positioning of the first and the second patch antennas of the circuit board and the lens element 112 in relation to the center axis A of the lens element 112 (i.e. the respective distances $r_1$ and $r_2$ between the center axis A and the first and second patch antennas).

Still referring to the integration between the circuit board and the lens element 112, the EBG may be implemented as an airgap between conductive plate of the circuit board serving as the ground plane 115 and the back end of the lens element 112. In this regard, the circuit board may be provided with a reinforcing element (such a metal bar or a bar made of another substantially stiff material) arranged on the opposite side of the circuit board to ensure sufficient planarity of the circuit board at the location of the first and second patch antennas and hence ensure correct distance k between the plane 115 on which the first and second patch antennas are mounted and the back end of the lens element 112.

The lens element 112 may directly serve as the outer surface of the antenna assembly 110, thereby dispensing with the need for usage of a radome or other separate protective element for protecting the antenna assembly 110 from weather (and other) conditions that may affect the performance of the antenna assembly 110 and/or the radar apparatus 100 employing the antenna assembly 110. As an example in this regard, the outer surface of the lens element 112 (or one or more portions thereof) may be coated by a protective layer (e.g. a protective film) that protects the lens element 112 against oxidation that may occur due exposure to ultraviolet light in outdoor conditions. If using such a coating, the material of the coating is preferably selected such that coating has a dielectric constant that matches that of the lens element 112 to minimize (e.g. to reduce or even completely eliminate) backscattering of the outbound radio waves at the coated front end of the lens element 112.

In the foregoing, various examples of an advantageous structure of the antenna assembly 110 are described with references to the first feed antenna 111a and the second feed antenna 111b that may be offset from the center axis A of the lens element 112 by respective distances $r_1$ and $r_2$. In a variation of such an approach, the first feed antenna 111a may be replaced with a first feed antenna group including two or more first feed antenna elements and the second feed antenna 111b may be replaced with second antenna group including two or more second feed antenna elements, arranged with respect to the center axis A of the lens element 112 such that a geometrical center point of the two or more first feed antenna elements is offset from the center axis A by the first distance $r_1$ and that the a geometrical center point of the two or more second feed antenna elements is offset from the center axis A by the second distance $r_2$. As in the case of the first feed antenna 111a and the second feed antenna 111, the respective feed antenna elements of the first and second feed antenna groups may be implemented by respective patch antennas arranged on the circuit board.

Figure 4:
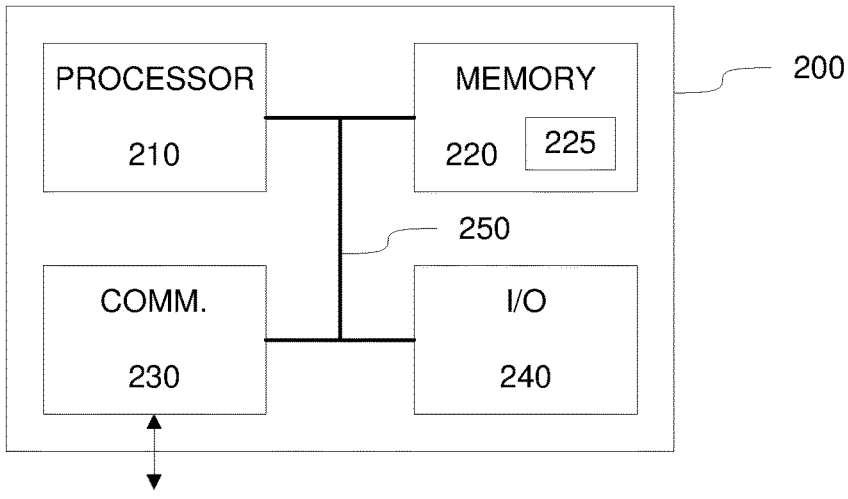
FIG. 4 illustrates a block diagram of some components of an apparatus according to an example.

FIG. 4 illustrates a block diagram of some components of an apparatus 200 that may be employed to implement operations described in the foregoing with references to the processing unit 150. The apparatus 200 comprises a processor 210 and a memory 220. The memory 220 may store data and computer program code 225. The apparatus 200 may further comprise communication means 230 for wired or wireless communication with other apparatuses. The communication means 230 may enable communication with apparatuses that are provided as part of the radar apparatus 100 and/or with apparatuses that are external to the radar apparatus 100. As an example of the former, the communication means 230 may enable communication with the transmitter 120 and/or with the receiver 130. The apparatus may further comprise user I/O (input/output) components 240 that may be arranged, together with the processor 210 and a portion of the computer program code 225, to provide the user interface for receiving input from a user and/or providing output to the user. In particular, the user I/O components may include user input means, such as one or more keys or buttons, a keyboard, a touchscreen or a touchpad, etc. The user I/O components may include output means, such as a display or a touchscreen. The components of the apparatus 200 are communicatively coupled to each other via a bus 250 that enables transfer of data and control information between the components.

The memory 220 and a portion of the computer program code 225 stored therein may be further arranged, with the processor 210, to cause the apparatus 200 to perform at least some aspects of operation of the processing unit 150 described in the foregoing. The processor 210 is configured to read from and write to the memory 220. Although the processor 210 is depicted as a respective single component, it may be implemented as respective one or more separate processing components. Similarly, although the memory 220 is depicted as a respective single component, it may be implemented as respective one or more separate components, some or all of which may be integrated/removable and/or may provide permanent/semi-permanent/dynamic/cached storage.

The computer program code 225 may comprise computer-executable instructions that implement at least some aspects of operation of the processing unit 150 described in the foregoing when loaded into the processor 210. As an example, the computer program code 225 may include a computer program consisting of one or more sequences of one or more instructions. The processor 210 is able to load and execute the computer program by reading the one or more sequences of one or more instructions included therein from the memory 220. The one or more sequences of one or more instructions may be configured to, when executed by the processor 210, cause the apparatus 200 to perform at least some aspects of operation of the processing unit 150 described in the foregoing. Hence, the apparatus 200 may comprise at least one processor 210 and at least one memory 220 including the computer program code 225 for one or more programs, the at least one memory 220 and the computer program code 225 configured to, with the at least one processor 210, cause the apparatus 200 to perform at least some aspects of operation of the processing unit 150 described in the foregoing.

The computer program code 225 may be provided e.g. a computer program product comprising at least one computer-readable non-transitory medium having the computer program code 225 stored thereon, which computer program code 225, when executed by the processor 210 causes the apparatus 200 to perform at least some aspects of operation of the processing unit 150 described in the foregoing. The computer-readable non-transitory medium may comprise a memory device or a record medium such as a CD-ROM, a DVD, a Blu-ray disc or another article of manufacture that tangibly embodies the computer program. As another example, the computer program may be provided as a signal configured to reliably transfer the computer program.

Reference(s) to a processor herein should not be understood to encompass only programmable processors, but also dedicated circuits such as field-programmable gate arrays (FPGA), application specific circuits (ASIC), signal processors, etc. Features described in the preceding description may be used in combinations other than the combinations explicitly described.

The invention claimed is:

1. An antenna assembly for a radar apparatus, the antenna assembly comprising:
   a first feed antenna arranged to transmit outbound radio waves of a transmitter beam based on a transmitted RF signal supplied thereto and a second feed antenna arranged to capture a received RF signal based on inbound radio waves of a receiver beam received thereat; and
   a lens element arranged to collimate the transmitter beam obtained via a back end of the lens element for transmission from a front end of the lens element to a monitoring direction and to focus the receiver beam received at the front end of the lens element from the monitoring direction for reception via the back end of the lens element at the second feed antenna, wherein the lens element is axially symmetrical and the front end of the lens element has a convex shape,
   wherein the first and second feed antennas are disposed on a conductive ground plane that is offset from the back end of the lens element by a predefined distance in direction of a center axis of the lens element, and a volume between the back end of the lens element and the ground plane comprises material that has a refractive index that is smaller than that of the lens element for converging the outbound and inbound RF beams between the back end of the lens element and the first and second feed antennas,
   wherein the predefined distance is defined as $$k = 0.5 \frac{\lambda}{\sqrt{\varepsilon_{rc}}},$$

where $\lambda$ denotes a carrier wavelength applied for the transmitted and received RF signals and $\varepsilon_{rc}$ denotes relative dielectric constant of the material applied in the volume between the conductive ground plane and the back end of the lens element.

2. The antenna assembly according to claim 1, wherein the first feed antenna is offset from the center axis of the lens element to a first direction by a first distance, and the second feed antenna is offset from the center axis to a second direction by the second distance ($r_2$), where the second direction is different from the first direction.

3. The antenna assembly according to claim 2, wherein the first feed antenna and the second feed antenna are disposed at opposite sides of the center axis.

4. The antenna assembly according to claim 2, wherein the first distance is the same as the second distance.

5. The antenna assembly according to claim 1, wherein the volume between the back end of the lens element and the ground plane comprises an air gap.

6. The antenna assembly according to claim 1, wherein the first feed antenna is provided for coupling to a transmitter for receiving the transmitted RF signal therefrom via a first signal path and wherein the second feed antenna is provided for coupling to a receiver for supplying the received RF signal thereto via a second signal path that is separate and isolated from the first signal path.

7. The antenna assembly according to claim 1, wherein the first feed antenna is arranged to transmit the outbound radio waves using an orientation of polarization that is aligned with a conceptual line connecting respective positions of the first feed antenna and the second feed antenna.

8. The antenna assembly according to claim 7, wherein one of the following applies:

the orientation of polarization is in parallel to said conceptual line, the orientation of polarization is perpendicular to said conceptual line.

9. The antenna assembly according to claim 1, further comprising:

a circuit board having a conductive plate serving as the ground plane arranged thereon; and a first patch antenna for serving as the feed antenna and a second patch antenna for serving as the second feed antenna disposed on the conductive plate, wherein the circuit board is mounted at the back side of the lens element such that the first patch antenna is disposed at a first predefined distance from the symmetry axis of the lens element in a first direction from the center axis, the second patch antenna is disposed at a second predefined distance ($r_2$) from the center axis of the lens element in a second direction from the symmetry axis (A), and an air gap for serving as the volume between ground plane on which the first and second feed antennas are disposed and the back end of the lens element is formed.

10. A radar apparatus comprising:

an antenna assembly according to claim 1;

a transmitter arranged to supply the transmitted RF signal to the first feed antenna and a receiver arranged to receive the received RF signal captured at the second feed antenna; and a processing unit arranged to determine, based on the received RF signal in consideration of the transmitted RF signal, respective characteristics of one or more targets at distance from the antenna assembly in the monitoring direction, wherein said characteristics include at least one of the following:

respective locations of the one or more targets, respective velocities of the one or more targets, respective sizes of the one or more targets, respective shapes of the one or more targets.

11. The radar apparatus according to claim 10, wherein the first feed antenna is coupled to the transmitter for receiving the transmitted RF signal therefrom via a first signal path and wherein the second feed antenna is coupled to the receiver for supplying the received RF signal thereto via a second signal path that is separate and isolated from the first signal path.

12. The radar apparatus according to claim 10, wherein the transmitter and the receiver are arranged to apply a frequency modulated continuous wave, FMCW, transmission and reception.

13. The radar apparatus according to claim 12, wherein the transmitter and the receiver are provided as a Doppler transceiver arranged to apply the FMCW transmission and reception.

\* \* \* \* \*